United States Patent [19]

Mier

[11] Patent Number: 4,533,577
[45] Date of Patent: Aug. 6, 1985

[54] CONTAINER HAVING HEAT SEALED JUNCTURE REGION

[75] Inventor: Marjory A. Mier, Somerset, N.J.

[73] Assignee: Mobil Oil Corporation, New York, N.Y.

[21] Appl. No.: 563,739

[22] Filed: Dec. 21, 1983

Related U.S. Application Data

[63] Continuation-in-part of Ser. No. 453,243, Dec. 27, 1982.

[51] Int. Cl.³ .................. B32B 3/02; B32B 3/26; B32B 5/14
[52] U.S. Cl. .................. 428/35; 428/130; 428/157; 428/159; 428/170; 428/314.2; 428/316.6
[58] Field of Search .......... 428/35, 121–130, 428/156–160, 170, 172, 177, 192, 194, 314.2, 316.6, 161, 162

[56] References Cited

U.S. PATENT DOCUMENTS

| 3,256,527 | 6/1966 | Studen | 206/523 |
| 3,447,199 | 6/1969 | Trimble | 428/121 |
| 4,201,818 | 5/1980 | Rohn | 428/314.2 |

FOREIGN PATENT DOCUMENTS 2096616 10/1982 United Kingdom .

Primary Examiner—William J. Van Balen
Attorney, Agent, or Firm—Alexander J. McKillop; Michael G. Gilman; Charles J. Speciale

[57] ABSTRACT

A container having at least one heat-sealed juncture is formed from foam polymer sheet material. The foam polymer sheet material includes an area of crushed and compressed cellular structure directly adjacent the heat-sealed portion. The width of the crushed and compressed area is at least as great as the thickness of uncompressed foam in the layer.

10 Claims, 2 Drawing Figures

CONTAINER HAVING HEAT SEALED JUNCTURE REGION

CROSS REFERENCE TO RELATED APPLICATION

This application is a continuation-in-part of Ser. No. 453,243, filed Dec. 27, 1982.

BACKGROUND OF THE INVENTION

1. Field of the Invention

The present invention is related to containers of the type having at least one heat-sealed juncture region, and more particularly, to such containers formed from foam polymer sheet materials.

Foamed polystyrene is used for products such as egg cartons, food containers, meat trays, etc., since this material is readily thermoformable. However, many container structures are not suitable for thermal formation. Such structures include envelopes, multi-sided cartons, pouches for items such as french fries and others. These structures require a material which can be folded without cracking or breaking at the fold point. This excludes conventional foam polystyrene and poly(p-methylstyrene). Also, for these structures it is necessary or practical that juncture points of the panels of the structures be fastened together by heat sealing. However, foamed polystyrene generally has not been satisfactory for heat sealing, perhaps because of the thickness differential between the actual sealed portion and the remaining foamed structure.

2. Description of the Prior Art

U.S. Pat. No. 4,201,818 to Rohn describes a flexible plastic foam formed by partially crushing a foam sheet between textured rollers. The treatment is said to provide a product suitable as a replacement for paper. The disclosure of this patent is incorporated herein by reference. UK patent application No. 2,096,616A includes a similar disclosure.

U.S. Pat. No. 3,256,527 to Studen describes a process for forming envelopes by heat sealing. Two layers of foam are heat-sealed through the application of heat and pressure. Heat is also supplied for a short distance beyond the area in which pressure is applied.

SUMMARY OF THE INVENTION

Is an object of the present invention to provide a container of a foam polymer sheet material which can be heat-sealed at necessary seam or panel juncture regions.

It is a further object of the present invention to provide a container of a foam polymer sheet material which is not likely to crack at heat-sealed areas.

It is a further object of this invention to provide a container having good insulation properties which can be produced simply and economically.

The above objects and others are obtained by providing a container which includes at least one layer of a foam polymer sheet material, which is heat-sealed to a second layer of a polymer sheet material. The second layer may or may not be foam polymer. The first layer has an area of crushed and compressed cellular structure directly adjacent the heat-sealed portion of the first layer. This area of crushed and compressed cellular structure has a width which is at least as great as the thickness of uncompressed foam in the first layer. The crushed and compressed cellular structure is adjacent at least one of the two major surfaces of the first layer.

To produce such a first layer, there is employed a polymer foam which has been treated in such a way as to crush and compress the cell structure of the foam, thus partially destroying the resilience and surface character of the foam and removing at least some compressed gaseous material trapped within the foamed structure. This also reduces the gauge of the foam and causes some of the previously gas-filled cells to become crushed and compressed.

This treatment is accomplished by sandwiching the foamed plastic sheet between surfaces, at least one of which is textured (e.g., screen-like), placed in a press or other suitable compressing means and compressed to reduce the thickness of the sheet while simultaneously crushing a substantial portion of the cells of the foamed sheet at one or both surfaces of the sheet. Although the cells of the foam become crushed, they remain unruptured. Some ruptured cells can be found at the surface, but not more than can be found with uncrushed foam. The foam is crushed to be about 60–70% of its original thickness. Preheating the foam has been found to have little effect. The foam cells tend to be flattened in the direction of applied pressure and buckle in an "S" curve. The foamed sheet can be subjected to a second compression between smooth surfaces if a sheet with a smoother surface is desired. This will further densify or further reduce the thickness of the foamed sheet and also restore some of the smooth character to the surface of the sheet. This process is described in U.S. Pat. No. 4,201,818.

Foamed sheet processed in the manner described above possesses improved folding characteristics. The terms "folding" or "foldable" are used in the same sense that cellulosic paper is foldable. Just as paper can be folded upon itself and creased at the fold line, the crushed and compressed foamed polymer has at least similar characteristics.

The product formed as a result of this process possesses excellent paper-like surface characteristics. Generally, a paperboard will be stiffer and show greater tensile strength than the crushed foam. The foam can be used in a laminate with cloth and/or another polymer such as high impact polystyrene to provide improved mechanical properties. Compression of the foam does not decrease thermal insulation properties, and the compressed foam is about twice as effective as an insulator as paperboard. The compressed foam also has improved oxygen, moisture and grease resistance as compared to paperboard. It also has been determined that as a result of processing the sheet in this manner, the resulting polymer can be bonded to itself or to another material with a bonding strength which is considerably stronger than foamed polymer not possessing the crushed and compressed cells obtained as a result of the compression treatment. Examples of useful products include envelopes, place mats, cups, ice cream cartons, pie or sandwich boxes, french fry pouches and serving trays.

DETAILED DESCRIPTION OF THE INVENTION

Figure 1:
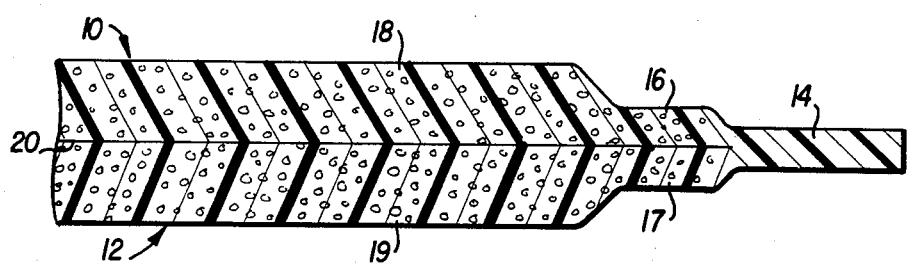
FIG. 1 shows a sectional side view of a heat-sealed envelope prepared from a sheet of foam polymeric material according to the present invention.

Referring to FIG. 1, an envelope can be prepared which has two layers 10 and 12 of foamed polymeric sheet material. These layers can be produced by using two separate sheets of material, or by folding a single sheet of material upon itself. The two layers are joined at the heat-sealed region 14.

Directly adjacent to the heat-sealed portion of the envelope is an area of crushed and compressed cellular structure 16 or 17. The compressed and crushed cellular structure of the areas 16 or 17 is adjacent at least one of the two major surfaces which the layers have. That is, the compressed and crushed cellular structure is near the top and/or bottom of the layers 10 and 12. It also is desirable to have the crushed cellular structure in the area of any folding.

Crushed area 16 of the layer 10 has a width which is at least as great as the thickness of uncrushed portion 18 and crushed area 17 has a width which is at least as great as the thickness of uncrushed portion 19. The thickness of the uncrushed portion of the foam layer is meant to refer to the thickness in the vicinity of the crushed and compressed area. Variations in the thickness of the layer 18 or 19 at points removed from the crushed areas 16 and 17 have no bearing upon the performance of the present invention. Also, it should be noted that the width of the crushed areas 16 and 17 can be independent of each other. For example, if layer 10 was thinner than layer 12, area 16 could be narrower than area 17. Also, it is not essential that the portions 18 and 19 be present at all. That is, both layers 10 and 12 can be formed completely of crushed and compressed foam polymer sheet material.

Line 20 is provided in FIG. 1 to show the boundary between the layers 10 and 12. The layers 10 and 12 are not connected along line 20. The layers merely abut each other at line 20 and are separated easily to provide the opening within the envelope.

Figure 2:
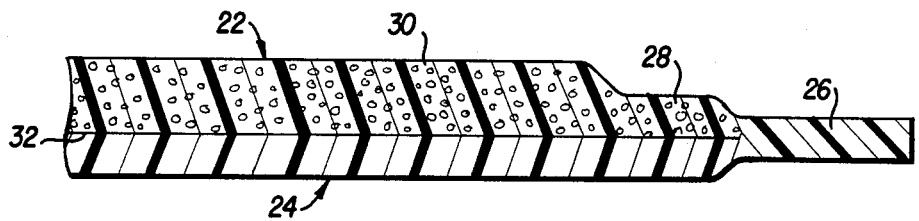
FIG. 2 shows a sectional side view similar to that of FIG. 1, except using one layer of unfoamed polymeric material.

FIG. 2 shows a second embodiment of the present invention which includes layers 22 and 24, which are heat-sealed together at 26. Layer 22 is of a foamed material while layer 24 is of an unfoamed polymer. The choice of unfoamed polymer will depend upon the desired use of the product, but could include, for example, unfoamed polyethylene or unfoamed polystyrene. Like layers 10 and 12 of FIG. 1, layer 22 is provided with crushed and compressed area 28. As with the previous embodiment, crushed area 28 has a width which is equal to the thickness of the uncompressed portion 30 of layer 22. As mentioned previously, it is not essential that layer 22 be provided with an uncrushed portion 30. Layer 22 may be formed from a sheet which is completely crushed.

In the drawings, the crushed areas 16, 17 and 28 have been formed through compression at one major surface of the layers 10, 12 and 22 respectively. However, it would be equally effective if the layers were crushed at both major surfaces prior to heat sealing.

The present invention contemplates employing any foamed thermoplastic polymer, the cells of which can be crushed and compressed so that gauge can be reduced. Preferred are polystyrene and poly(p-methylstyrene) foam. In accordance with U.S. Pat. No. 4,201,818, polystyrene foamed sheet of a density of 10 g/100 in.$^2$ basis weight was pressed between window screens of mesh size 16 at a pressure of about 670 pounds per square inch for about ten minutes. The sheet prior to pressing had an average thickness of about 100 mils. Following compression the sheet had an average thickness of about 25 mils. Strips of the so pressed and so fractured foam were heat-sealed on a Vertrod Thermal Impulse Heat Sealer. The seals produced were significantly stronger than seals formed in strips of unpressed foam. Strips made of the precursor, unpressed foam which were heat-sealed, broke apart quite easily. The weakness is believed to be due to the thickness differential between the interfacial sealed region and the gross thickness of the uncrushed cellular foam structure. This gross cellular thickness is considerably reduced by the process of U.S. Pat. No. 4,201,818 and the result is that a crushed and compressed cell structure of this type provides an excellent heat-sealed region.

In accordance with the present invention three types of containers were made having the comparatively strong heat seal junctures described herein. One is a mailing envelope prepared by folding a length of crushed and compressed polystyrene sheet upon itself so as to leave a closure flap extending beyond the folded over portion. The sides were heat-sealed and the extension cut to a triangular shape for sealing or fastening by any means, including heat-sealing. Another is a tetrahedron carton with heat-sealed junctures made from the same polystyrene stock. The third is a pouch, such as could be used for french fries. This is formed by a sheet folded back upon itself and side heat-sealed. In all cases the heat-seals were firm and of greater strength than would be the case if noncrushed and noncompressed foam were employed.

What is claimed is:

1. A container comprising a first layer of a foam polymer sheet material;
   a second layer of a polymer sheet material which is heat-sealed to said first layer;
   said first layer having a flexible and foldable area of crushed and compressed cellular structure free of fusion caused by crushing and compressing directly adjacent the heat-sealed portion, said flexible and foldable area of crushed and compressed cellular structure having a width which is at least as great as the thickness of uncompressed foam in said first layer, said flexible and foldable crushed and compressed cellular structure being adjacent at least one of the two major surfaces of said first layer.

2. A container as in claim 1, wherein said second layer is of a foam polymer sheet material and said second layer has a flexible and foldable area of crushed and compressed cellular structure free of fusion caused by crushing and compressing directly adjacent the heat-sealed portion, said area of flexible and foldable crushed and compressed cellular structure being adjacent at least one of the two major surfaces of said second layer.

3. A container as in claim 1, wherein said second layer is of an unfoamed polymer sheet material.

4. A container as in claim 1, wherein said crushed and compressed cellular structure is adjacent each of the two major surfaces of said first layer.

5. A container as in claim 2, wherein said crushed and compressed cellular structure is adjacent each of the two major surfaces of each of said first and second layers.

6. A container as in claim 2, wherein said container is formed from polystyrene or poly(p-methylstyrene).

7. A container having at least one heat-sealed juncture, comprising:

a first layer of a flexible, foldable foam polymer sheet material having a two-dimensional extent and having a crushed and compressed cellular structure throughout the extent of the sheet, at least one of the two major surfaces of said foam polymer sheet material having a substantial number of crushed and compressed cells in close proximity thereto; and a second layer of an unfoamed polymer sheet material which is heat-sealed to said first layer at the substantial number of crushed and compressed cells to form the at least one heat-sealed juncture.

8. The container of claim 7, wherein the foam polymer sheet material contains crushed and compressed cells in close proximity to each of said two major surfaces.

9. The container of claim 7, wherein the foam polymer sheet material is formed from a polymer selected from the group consisting of polystyrene and poly(p-methylstyrene).

10. The container of claim 7, wherein the unfoamed polymer sheet material is formed from a polymer selected from the group consisting of polyethylene and polystyrene.

* * * * *